_(12)_ United States Patent
Danilov et al.

(10) Patent No.: US 10,817,204 B1
(45) Date of Patent: Oct. 27, 2020

(54) MIGRATION OF VERSIONED DATA BETWEEN STORAGE DEVICES

(71) Applicant: EMC IP Holding Company LLC, Hopkinton, MA (US)

(72) Inventors: Mikhail Danilov, Saint Petersburg (RU); Mikhail Borisov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 230 days.

(21) Appl. No.: 15/730,143

(22) Filed: Oct. 11, 2017

(51) Int. Cl.
*G06F 3/06* (2006.01)
*G06F 11/14* (2006.01)

(52) U.S. Cl.
CPC .......... *G06F 3/0647* (2013.01); *G06F 3/0604* (2013.01); *G06F 3/067* (2013.01); *G06F 3/0614* (2013.01); *G06F 11/1448* (2013.01)

(58) Field of Classification Search
CPC .... G06F 3/0647; G06F 3/0604; G06F 3/0614; G06F 3/067; G06F 11/1448; G06F 1/10–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20; G06F 2209/00–549;

(Continued)

(56) References Cited

U.S. PATENT DOCUMENTS 7,949,512 B2 * 5/2011 Retnamma ............ G06F 3/0619
 703/24
8,326,939 B2 * 12/2012 Ueno .................... G06F 3/0604
 709/201

(Continued)

OTHER PUBLICATIONS

B. de Alwis and J. Sillito, "Why are software projects moving from centralized to decentralized version control systems?," 2009 ICSE Workshop on Cooperative and Human Aspects on Software Engineering, Vancouver, BC, 2009, pp. 36-39 (Year: 2009).*

(Continued)

*Primary Examiner* — Daniel C. Chappell
(74) *Attorney, Agent, or Firm* — Amin, Turocy & Watson, LLP

(57) ABSTRACT

Facilitating migration of versioned data in a reverse chronological order is provided herein. A system can comprise a processor and a memory that stores executable instructions that, when executed by the processor, facilitate performance of operations. The operations can comprise initiating a migration of information from a source storage device to a target storage device. The information can comprise a current object version of data and previous object versions of the data. The current object version of data can comprise portions of the previous object versions of the data. The operations can also comprise facilitating a first migration of the current object version prior to the migration of the previous object versions. Further, the operations can comprise facilitating a second migration of the previous object versions in a reverse migration order.

20 Claims, 12 Drawing Sheets

(58) Field of Classification Search
CPC ...... G06F 2211/00–902; G06F 2212/00–7211;
G06F 2213/00–4004; G06F 2216/00–17;
G06F 2221/00–2153
See application file for complete search history.

(56) References Cited

U.S. PATENT DOCUMENTS

| | | | | |
|---|---|---|---|---|
| 8,392,370 | B1* | 3/2013 | Whitney | G06F 3/067 |
| | | | | 707/640 |
| 8,719,286 | B1* | 5/2014 | Xing | G06F 11/1451 |
| | | | | 707/755 |
| 8,996,566 | B2 | 3/2015 | Haustein | G06F 11/1448 |
| | | | | 707/769 |
| 9,087,062 | B2* | 7/2015 | Bennett | G06F 16/113 |
| 9,104,340 | B2* | 8/2015 | Prahlad | G06F 3/0649 |
| 9,164,692 | B2* | 10/2015 | Kavuri | G06F 3/0605 |
| 9,176,679 | B2* | 11/2015 | Oberhofer | G06F 3/061 |
| 9,400,741 | B1* | 7/2016 | Bono | G06F 12/023 |
| 9,507,525 | B2* | 11/2016 | Kottomtharayil | G06F 3/0605 |
| 9,830,105 | B1* | 11/2017 | Tummala | G06F 3/0617 |
| 9,880,870 | B1* | 1/2018 | Danilov | G06F 9/45558 |
| 10,268,411 | B1* | 4/2019 | Dantkale | G06F 3/061 |
| 10,275,318 | B2* | 4/2019 | Littlefield | G06F 11/1469 |
| 10,649,952 | B1* | 5/2020 | Chakankar | G06F 3/0647 |
| 2006/0271604 | A1* | 11/2006 | Shoens | G06F 16/128 |
| 2008/0162662 | A1* | 7/2008 | Fujita | G06F 11/1464 |
| | | | | 709/214 |
| 2009/0282203 | A1* | 11/2009 | Haustein | G06F 11/1461 |
| | | | | 711/162 |
| 2011/0010514 | A1* | 1/2011 | Benhase | G06F 3/061 |
| | | | | 711/162 |
| 2015/0378636 | A1* | 12/2015 | Yadav | G06F 3/0608 |
| | | | | 711/165 |
| 2016/0224274 | A1* | 8/2016 | Kato | G06F 3/0647 |
| 2017/0031781 | A1* | 2/2017 | Koeninger | G06F 11/1451 |
| 2017/0083549 | A1* | 3/2017 | Danilov | G06F 16/2329 |
| 2017/0277435 | A1* | 9/2017 | Wadhwa | G06F 3/0605 |
| 2017/0277596 | A1* | 9/2017 | Kyathanahalli | G06F 16/27 |
| 2017/0277597 | A1* | 9/2017 | Dillon | G06F 11/1453 |

OTHER PUBLICATIONS

F. F. Silva, E. Borel, E. Lopes and L. G. P. Murta, "Towards a Difference Detection Algorithm Aware of Refactoring-Related Changes," 2014 Brazilian Symposium on Software Engineering, Maceio, 2014, pp. 111-120 (Year: 2014).*

Jacob Gorm Hansen and Eric Jul. 2010. Scalable virtual machine storage using local disks. SIGOPS Oper. Syst. Rev. 44, 4 (Dec. 2010), 71-79. (Year: 2010).*

Dutch T. Meyer, Gitika Aggarwal, Brendan Cully, Geoffrey Lefebvre, Michael J. Feeley, Norman C. Hutchinson, and Andrew Warfield. 2008. Parallax: virtual disks for virtual machines. In Proceedings of the 3rd ACM SIGOPS/EuroSys European Conference on Computer Systems 2008 (Eurosys '08). ACM. 51-54. (Year: 2008).*

* cited by examiner

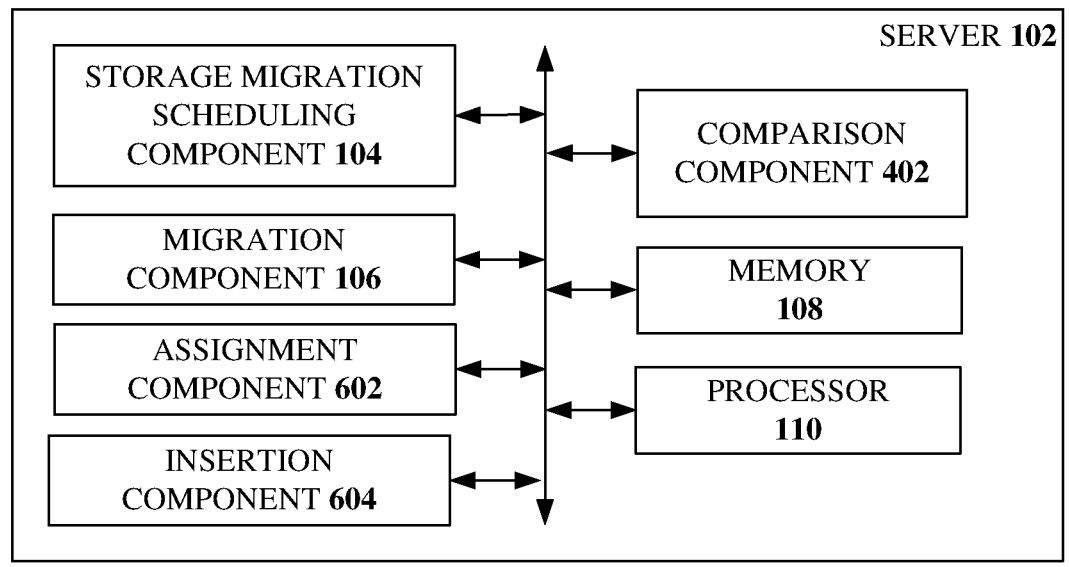
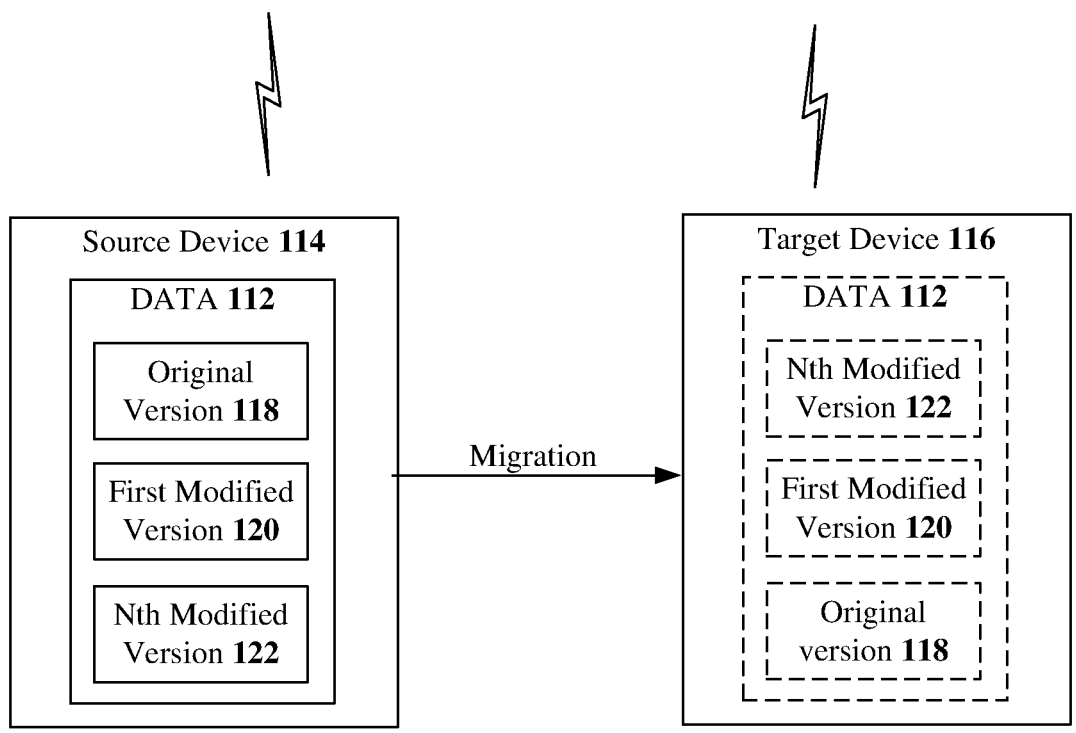
FIG. 6

MIGRATION OF VERSIONED DATA BETWEEN STORAGE DEVICES

TECHNICAL FIELD

The subject disclosure relates generally to data storage. More specifically, this disclosure relates to migration of versioned data between storage devices.

BACKGROUND

Distributed storage systems and/or object storage systems can provide a wide range of storage services while achieving high scalability, availability, and serviceability. An example of such storage systems is referred to as Elastic Cloud Storage (ECS), which uses the latest trends in software architecture and development to achieve the above noted services, as well as other services.

Elastic cloud storage can implement multiple storage Application Programming Interfaces (APIs), which can include a Content-Addressable Storage (CAS) platform for data archiving, a web service that provides storage through web service interfaces, as well as others. Entities with applications that use the APIs supported can benefit from switching to elastic cloud storage. Thus, solutions to migrate legacy data stored in existing standalone storage within elastic cloud storage can be beneficial.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments relate to a method that can comprise determining, by a system comprising a processor, that data of a first storage device is scheduled to be migrated to a second storage device. The data can be represented according to a first version and a second version. The first version was created prior to the second version. The method can also include facilitating, by the system, a first migration of the second version from the first storage device to the second storage device. In addition, the method can include, based on a determination that the first migration of the second version has completed, facilitating, by the system, a second migration of the first version from the first storage device to the second storage device. According to an implementation, the method can include identifying, by the system, the first version by an object identifier and a first version identifier and identifying, by the system, the second version by the object identifier and a second version identifier.

Another embodiment relates to a system comprising a processor and a memory that stores executable instructions that, when executed by the processor, facilitate performance of operations. The operations can comprise initiating a migration of information from a source storage device to a target storage device. The information can comprise a current object version of data and previous object versions of the data. The current object version of data can comprise portions of the previous object versions of the data. The operations can also comprise facilitating a first migration of the current object version prior to the migration of the previous object versions. Further, the operations can comprise facilitating a second migration of the previous object versions in a reverse migration order.

A further embodiment relates to a computer-readable storage medium comprising instructions that, in response to execution, cause a system comprising a processor to perform operations. The operations can comprise mapping a first device to a second device based on a first determination that data contained in the first device is to be migrated to the second device. The data can comprise an original object version and modified object versions. The operations can also comprise facilitating a first migration of a last modified object version of the modified object versions and facilitating a second migration of a second last modified object version of the modified object versions. Further, the operations can comprise facilitating a third migration of the original object version based on a second determination that migration of the modified object versions has completed.

According to an implementation, the operations can comprise determining a first delta between the last modified object version and the second last modified object version. The first delta can comprise first content. Facilitating the second migration can comprise facilitating a first movement of the first content. Further to this implementation, the operations can comprise determining a second delta between the second last modified object version and the original object version. The second delta can comprise second content. Facilitating the third migration can comprise facilitating a second movement of the second content.

In accordance with some implementations, the operations can comprise designating, by the system, the last modified object version of the data as an unchangeable data portion. Further to these implementations, the operations can comprise adding, by the system, an updated version of the data to the second device. The updated version can comprise an incremental data change to the last modified object version.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 6 illustrates an example, non-limiting, system that facilitates new versions of an object after migration in accordance with one or more embodiments described herein;

DETAILED DESCRIPTION

Figure 1:
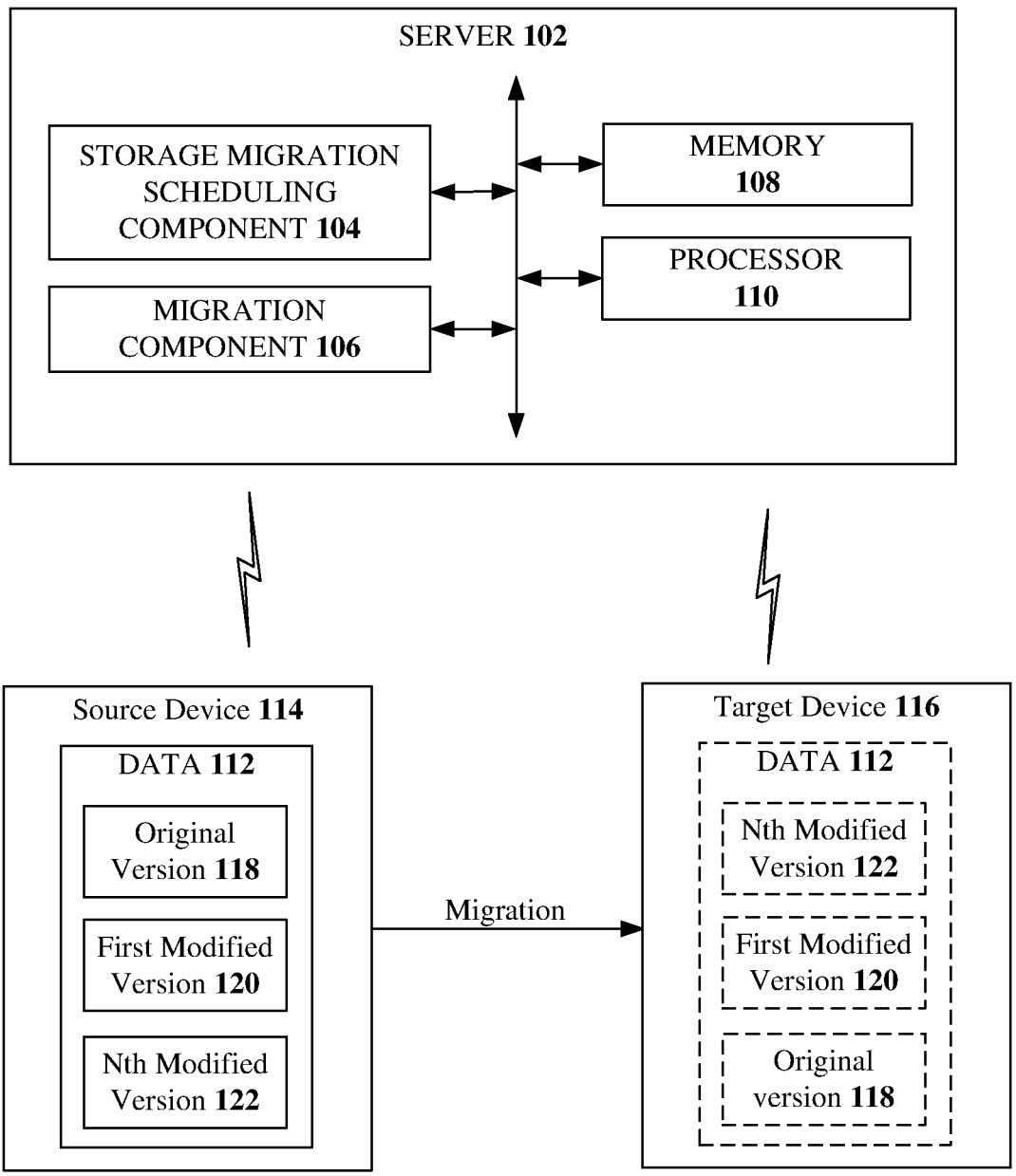
FIG. 1 illustrates an example, non-limiting, system for migration of data between storage devices in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Discussed herein are various aspects that can relate to facilitating migrating data from a source storage device to a target storage device in a reverse order. Thus, a current version of the data can be migrated before previous versions of the data. For example, a first version of the data is created and retained in a source storage device. Over time, the first version of data is modified (e.g., changes are made to the content, content is deleted, content is added, and so on) and a second version of the data is created and retained in the source storage device. Later in time (e.g., hours later, days later, and so on), content in the second version of the data is modified, creating a third version on the data, which call also be retained in the source storage device. In this example, the third version of the data is the current version. Therefore, when the data is to be migrated from the source storage device to the target storage device, the third version of the data can be migrated first. Upon or after migration of the third version of the data, the second version of the data can be migrated. Upon or after migration of the second version of the data, the first version of the data can be migrated.

Migration of the data in the reverse order can facilitate a higher input-output (I/O) performance and less per-object capacity overheads. According to some implementations, by migrating the data in the reverse order (e.g., the latest or most current version is migrated first), the latest version is migrated into the target device as a single piece. This can enable faster data reading since there is no need to provide information across a cluster and the data can be compiled with that version.

As used herein, the term "storage device," "first storage device," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

FIG. 1 illustrates an example, non-limiting, system 100 for migration of data between storage devices in accordance with one or more embodiments described herein. The system can be implemented as a storage system that supports data versioning (e.g., an Elastic Cloud Storage). Thus, the system 100 can facilitate the migration of all data versions from a source storage device to a target storage device. Further, the system 100 can facilitate the migration of all the data versions in a reverse order (e.g., a reverse chronological order, or from newest to oldest data).

The system 100 can include a server device 102 that can perform storage migration as discussed herein. The server device 102 can include a storage migration scheduling component 104, a migration component 106, at least one memory 108, and at least one processor 110.

The storage migration scheduling component 104 can determine that data 112 of a first device (e.g., a source device 114) is scheduled to be migrated to a second device (e.g., a target device 116). As illustrated, the data 112 can comprise various data versions. For example, the data 112 can comprise an original version 118, and a first modified version 120 through an Nth modified version 122, where N is an integer greater than or equal to zero. In the cases where N is equal to zero, it indicates that no subsequent modified versions are available in addition to the first modified version 120. By way of example and not limitation, the original version 118 can be a first version of the data 112. The original version 118 can be created upon creation of the data or can be integrated (e.g., copied, migrated and so on) into the source device 114 from another location. Overtime, modifications can be made to the original version 118, which can result in a first modified version 120. In some implementations, other modifications can be made to the first modified version 120, resulting in one or more subsequent modified versions (e.g., Nth modified version 122). However, according to some implementations, no subsequent modified versions are created, thus, there is only the original version 116 and the first modified version 120 included in the data 112 (e.g., there is no Nth modified version 122).

In some cases, the storage devices (e.g., the source device 114 and the target device 116) can be included in respective storage nodes, which can include one or more services and/or one or more storage devices. In some embodiments, a storage node can comprise various services including: an authentication service to authenticate requests, storage APIs to parse and interpret requests, a storage chunk management service to facilitate storage chunk allocation/reclamation for different storage system needs and monitor storage chunk health and usage, a storage server management service to manage available storage devices capacity and to track storage devices states, and a storage server service to interface with the storage devices.

Further, a storage cluster can include one or more storage nodes. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

The source device 114 can be an existing storage device associated with a first entity and the target device 116 can be a new or existing storage device of the first entity or a second entity. As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

In accordance with some implementations, the storage migration scheduling component 104 can determine that the data 112 is to be migrated from the source device 114 to the target device 116. The determination by the storage migration scheduling component 104 can be made based on receipt of a request for the migration of the data 112. In another example, the determination by the storage migration scheduling component 104 can be made based on other parameters (e.g., a scheduled migration of data, a request from the target device 116 for the data 112, and so on).

Based on the indication that the data 112 is to be transferred from the source device 114 to the target device 116. The migration component 106 can perform a first migration of the newest data (e.g., the Nth modified version 122). Upon or after the migration of the newest data, the migration component 106 can perform a second migration of other next newest data (e.g., the first modified version 120). Upon or after the migration of the next newest data, the migration component 106 can perform a third migration of the original version 118. Accordingly, the migration component 106 can perform the migration in a reverse chronological order (e.g., newest to oldest).

According to some implementations, the determination by the migration component 106 as to the order of the movement of the data can be a reverse chronological order. Therefore, the data that is the most recent is moved before older data. The chronological order of the data can be determined based on version identifiers. For example, the first version can be identified by an object identifier and a first version identifier; the second version can be identified by the object identifier and a second version identifier; and a subsequent version can be identified by the object identifier and a subsequent version identifier. Accordingly, the migration component 106 can determine the migration order based on the object identifier and the respective version identifiers. Therefore, the object identifier can be used across the different versions. Accordingly, there can be several versions identified with the same object identifier. Further, in some implementations, the version identifier can be optional. For example, the version identifier can be a null value, which can identify a current/latest version.

With continuing reference to the server device 102, the at least one memory 108 can be operatively coupled to the at least one processor 110. The at least one memory 108 can store protocols associated with facilitating storage migration/transformation in data storage environment as discussed herein. Further, the at least one memory 108 can facilitate actions to control communication between the server device 102 and the one or more storage devices (e.g., the source device 114, the target device 116), such that the system 100 can employ stored protocols and/or algorithms to achieve improved storage migration/transformation as described herein.

It should be appreciated that data store components (e.g., memories) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 110 can facilitate processing data related to migration/transformation as discussed herein. The at least one processor 110 can be a processor dedicated to analyzing and/or generating information received, a processor that controls one or more components of the system 100, and/or a processor that both analyzes and generates information received and controls one or more components of the system 100.

Figure 2:
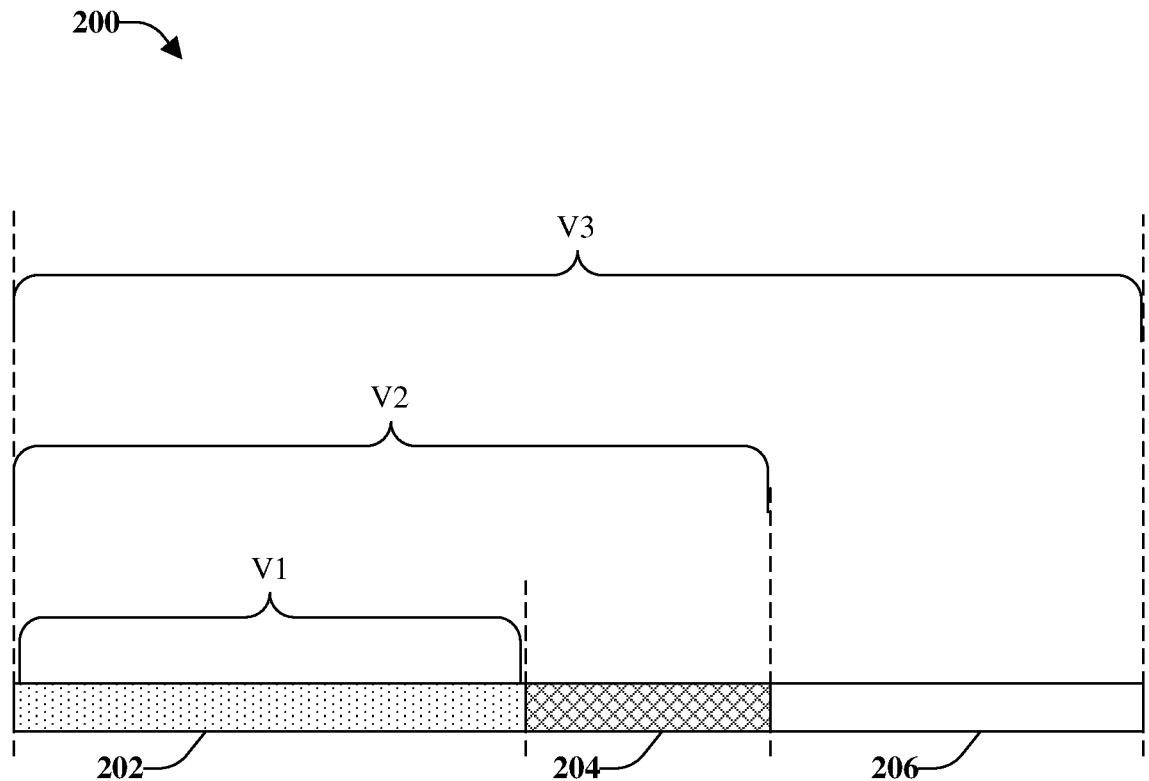
FIG. 2 illustrates an example, non-limiting, pictorial representation of de-duplication at object level in accordance with one or more embodiments described herein.

To further describe the disclosed aspects, FIG. 2 illustrates an example, non-limiting, pictorial representation 200 of de-duplication at object level in accordance with one or more embodiments described herein. Various storage devices (and storage APIs) support data versioning. If this feature is enabled, then one object (e.g., file, data, and so on) could have two or more versions. Each object version may be addressed explicitly by the pair [object ID, version ID]. For example, the object ID can be the same for different versions of the same object. Thus, there can be several versions (identified with respective version IDs) for one object (identified with a single (or the same) object ID). Thus, the object ID can be the same in all pairs [object ID, version ID] for a versioned object. Further, in some implementations, the version ID can be an optional parameter. For example, [object ID, null] references a current/latest version.

As can be expected, data versioning can increase per object capacity requirements. End-users can accept the increase when the feature is enabled. In order to facilitate a reduction of a defined measure of a per object capacity requirement, a storage system can employ a basic de-duplication at the object level, as illustrated by the pictorial representation 200 of the example de-duplication.

As illustrated, there can be three object versions, labeled as a first object version (V1), a second object version (V2), and a third object version (V3). Further, there can be three data segments, namely, a first data segment 202, a second data segment 204, and a third data segment 206. For purposes of simplicity, FIG. 2 illustrates the case where each new object version is created via appending some data to the previous object version. However, it should be understood that new object versions can be created differently. For example, some data in the middle of an object can be modified or another complex procedure can be performed). In addition, although three object versions and three data segments are shown and described, various implementations can have fewer or more object versions and data segments.

The first data segment 202 is referenced by the first object version (V1), the second object version (V2), and the third object version (V3). The second data segment 204 is referenced by the second object version (V2) and the third object version (V3). The third data segment 206 is referenced only by the third object version (V3).

Figure 3:
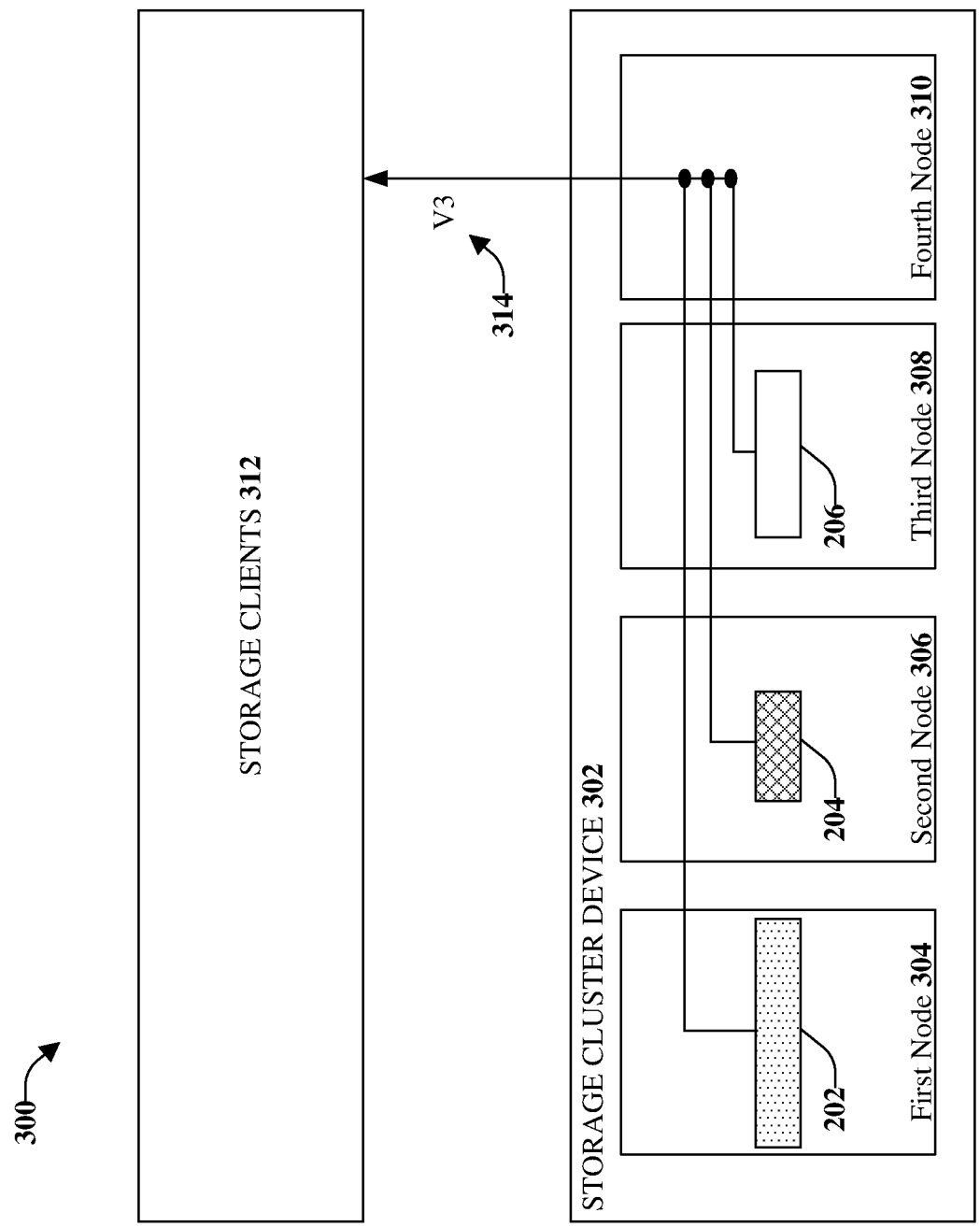
FIG. 3 illustrates an example, non-limiting, system that handles read requests for a last object version.

The data segments can be stored to different files, chunks, and so on. In the case of cluster-based storage, the segments can be stored to different cluster nodes. For example, FIG. 3 illustrates an example, non-limiting, system 300 that handles read requests for a last object version. FIG. 3 continues the example of FIG. 2. A storage cluster device 302 comprises four nodes, illustrated as a first node 304 (e.g., Node 1), a second node 306 (e.g., Node 2), a third node 308 (e.g., Node 3), and a fourth node 310 (e.g., Node 4).

The three data segments from FIG. 2 can be stored in the nodes. For example, the first data segment 202 can be stored in the first node 304, the second data segment 204 can be stored in the second node 306, and the third data segment 206 can be stored in the third node 308.

When there is a read request for the object version V3 from a storage client 312, the fourth node 310 (Node), which is the node that serves the read request, can assemble the object content using the data segments stored to the remote nodes (e.g., the first node 304, the second node 306, and the third node 308). The result can be passed back to the storage client, as indicated at 314. The fact that an object is assembled out of several data segments can impact performance of I/O operations. However, the performance impact is the tradeoff for keeping capacity overheads associated with data versioning reasonable.

It is noted that from the perspective of the object version V1, the data layout within the storage is suitable. Thus, there is no need to calculate its content and the content can be assembled out of a minimal number of segments.

There is time for each data storage to migrate data it contains to a newer storage. When a storage contains versioned data, its end-user could anticipate that all data versions are to be migrated. With the straightforward migration solution, data versions are migrated in a natural order (e.g., first-in, first out (FIFO)). As a result, data layout within a new storage (migration target) could repeat the one within the old storage (migration source).

According to the various aspects discussed herein, a reverse migration order (e.g., last-in, first out (LIFO)) for data versions can be beneficial in terms of both I/O performance and capacity use efficiency. For example, it has been observed that the latest version of an object (e.g., the Nth modified version 122) is usually the up-to-date version. In addition, the expected lifetime of the latest version (e.g., the Nth modified version 122) also can be the longest among all the versions.

Based on the above noted observation, a data layout, which can be created when object versions are created within a storage system in natural order, is not adequate. For example, the latest and the hottest version of data object could necessitate the largest amount of work to be performed in order to derive its content. In addition, the latest version could be described with the largest amount of system metadata (e.g., location information for latest data version, as indicated in Table 1 below). After all versions, except the latest version, are removed, the amount of system metadata that describe the latest version can remain large.

TABLE 1

| Segment # | Address | Size |
| --- | --- | --- |
| 1 | Node 1;Disc d1;Partition p1; Offset o1 | 4 |
| 2 | Node 2;Disc d2;Partition p2; Offset o2 | 2 |
| 3 | Node 3;Disc d3;Partition p3; Offset o3 | 3 |

Figure 4:
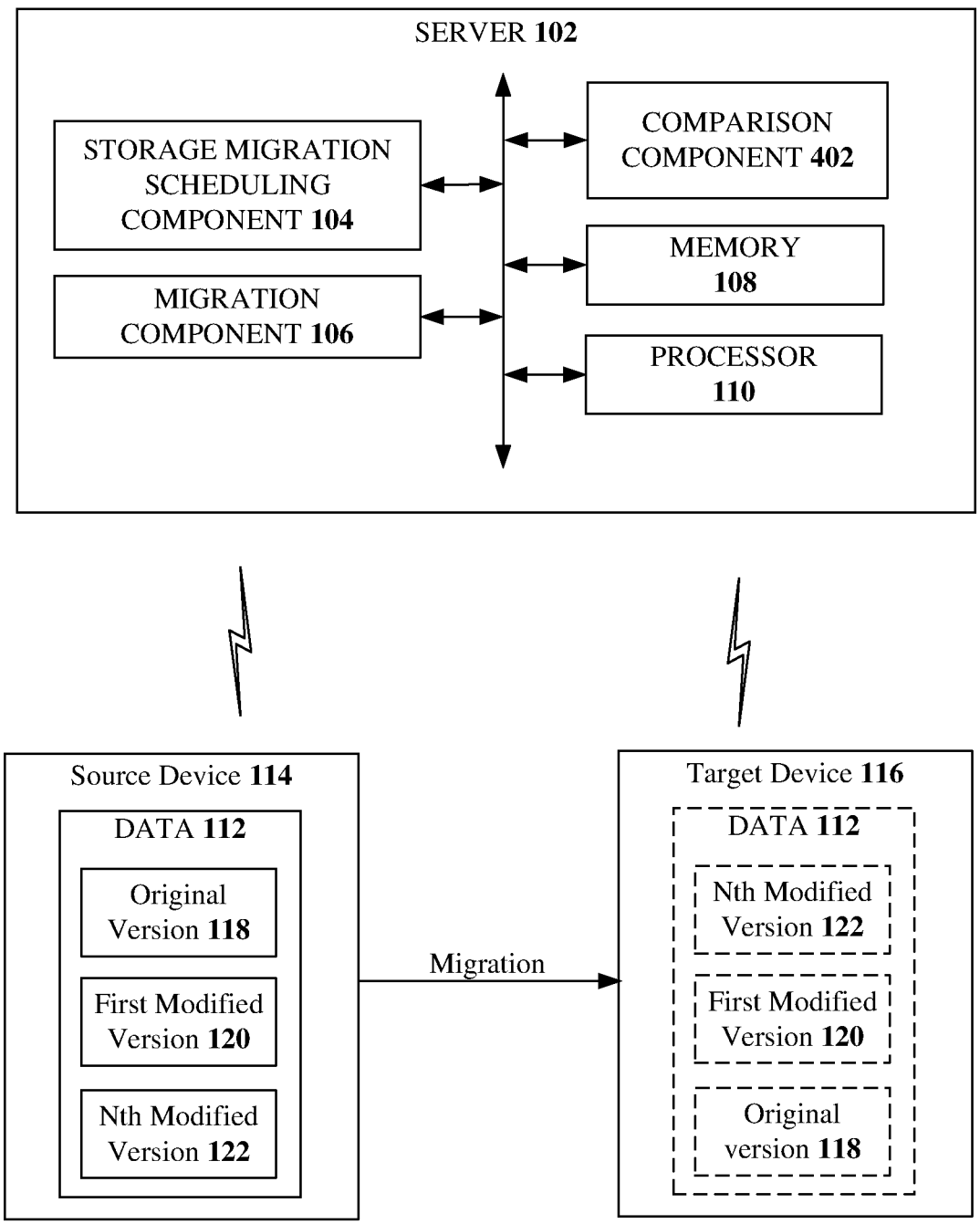
FIG. 4 illustrates an example, non-limiting, system that determines changes between data versions in accordance with one or more embodiments described herein.

FIG. 4 illustrates an example, non-limiting, system 400 that determines changes between data versions in accordance with one or more embodiments described herein. Repetitive description of like elements employed in other embodiments described herein is omitted for sake of brevity.

The system 400 can comprise one or more of the components and/or functionality of the system 100, and vice versa. The system 400 can comprise a comparison component 402 that can determine respective differences between the data versions. For example, the comparison component 402 can determine a first different between the Nth modified version 122 and the first modified version 120. Further, the comparison component 402 can determine a second difference between the first modified version 120 and the original version 118.

The migration component 106 can facilitate a first migration of the most recent, or last modified object version (e.g., the Nth modified data 122) from the source device 114 to the target device 116. Upon or after the migration of the last modified object version, the comparison component 402 can determine a first delta (e.g., a first difference) between a last modified object version (e.g., the Nth modified data 122) and the second last modified object version (e.g., the first modified data 120). The second last modified object version is the version of the object that existed in time one step earlier than the last modified object version. The first delta can comprise first content that represents the delta, or differences, between the last modified object version and the second last modified object version. The migration component 106 can facilitate a second migration that comprises a first movement of the first content from the source device 114 to the target device 116.

Upon or after the second migration, the comparison component 402 can determine a second delta (e.g., a second difference) between the second last modified object version and the original object version (e.g., the original version 118). The second delta can comprise second content that represents the differences between the second last modified object version and the original object version. The migration component 106 can facilitate a third migration that comprises a second movement of the second content. The delta or changes between the different object versions can be an incremental data change.

Figure 5:
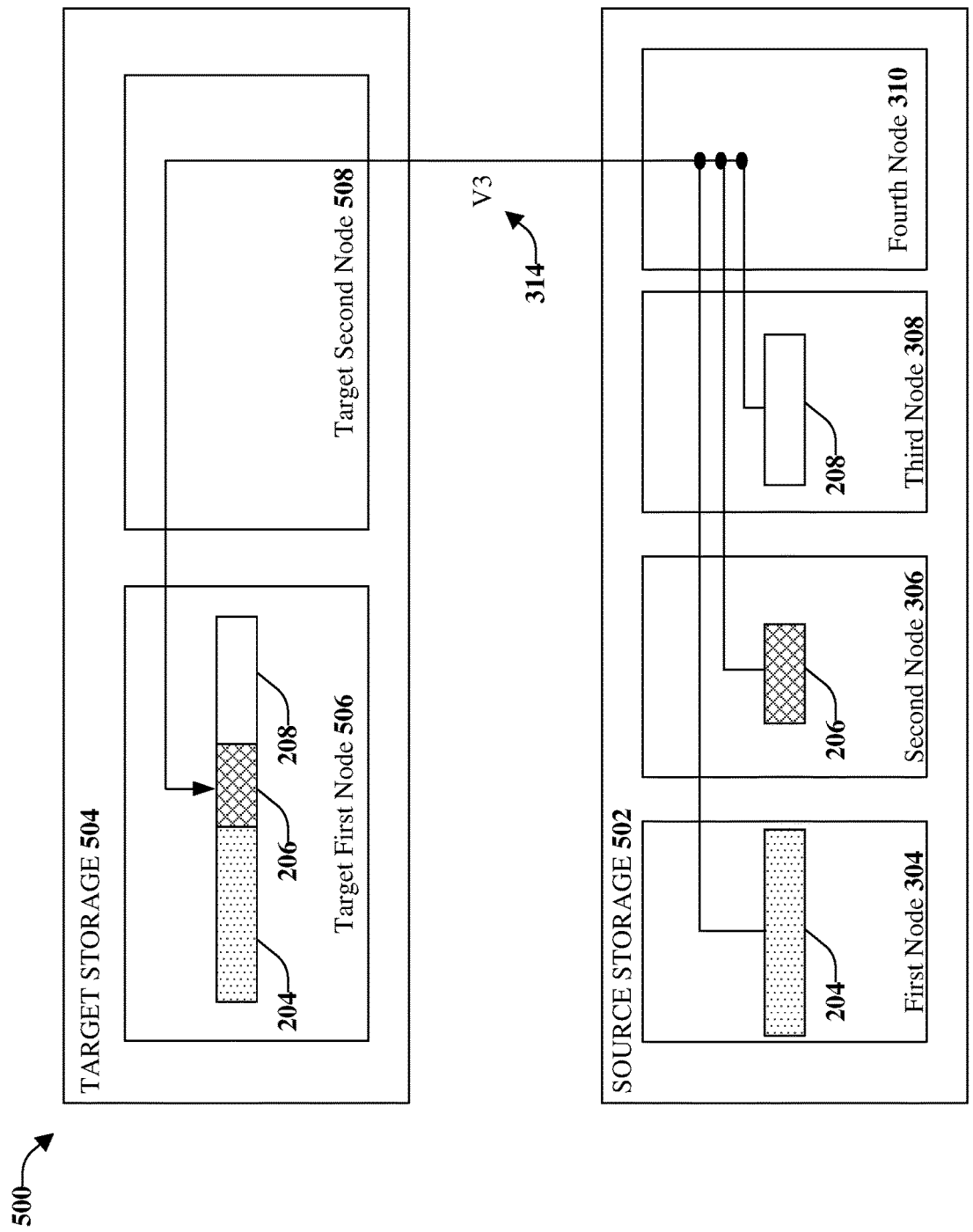
FIG. 5 illustrates an example, non-limiting, system that utilizes a reverse migration order wherein a latest data version is stored as a single piece in accordance with one or more embodiments described herein.

FIG. 5 illustrates an example, non-limiting, system 500 that utilizes a reverse migration order wherein a latest data version is stored as a single piece in accordance with one or more embodiments described herein. Repetitive description of like elements employed in other embodiments described herein is omitted for sake of brevity.

The system 500 can comprise one or more of the components and/or functionality of the system 100, the system 400, and vice versa. FIG. 5 demonstrates how the reverse migration order can change the data layout within a migration target storage.

Continuing the example from FIG. 2 and FIG. 3, data is to be migrated from a source storage 502 to a target storage 504. The target storage 504 can include a target first node 506 and a target second node 508. The target second node 508 can interface with the fourth node 310 of the source storage 502 to drive the migration. The data can be migrated to the target first node 506.

According to this example, when the latest version (e.g., the Nth modified version 122) migrates, first it can be stored in one piece/segment. Then, previous versions (e.g., the first modified version 120) can migrate one by one until reaching the first version (e.g., the original version 118). Delta for each data version can be calculated against the later data version, which migrated already. With the natural migration order the delta is calculated against the earlier data version. In the example of FIG. 5, the object versions V2 and V1 reference sub-segments of the object version V3.

Thus, the latest version of data, which is expected to be also the hottest one, necessitates the minimal amount of work to do in order to derive its content. Besides, the latest version is described with the minimal amount of system metadata (e.g., location information for latest data version stored in one piece, as indicated in Table 2 below.

TABLE 2

| Segment # | Address | Size |
|---|---|---|
| 1 | Node 1;Disc d1;Partition p1; Offset o1 | 9 |

At the beginning, the reduction of location information for the latest version could be performed at the expense of an increase of location information for earlier versions. However, after all versions, except the latest one, are removed, the amount of capacity needed to store location information for the remaining object versions can be significantly less than a migration performed with a non-reverse migration order (e.g., LIFO).

FIG. 6 illustrates an example, non-limiting, system 600 that facilitates new versions of an object after migration in accordance with one or more embodiments described herein. Repetitive description of like elements employed in other embodiments described herein is omitted for sake of brevity.

The system 600 can comprise one or more of the components and/or functionality of the system 100, the system 400, the system 500, and vice versa. As illustrated, the system 600 can comprise an assignment component 602 that can designate the most current version of the data (e.g., the Nth modified version 122) as an unchangeable data portion. Thus, the most current version of the data can be utilized as a reference point.

As updated data is received, an insertion component 604 can add a subsequent or further version of the data to the target device 116. The subsequent data version can comprise an updated data increment to the (previously) most current version of the data. The subsequent data version can comprise a reference to two data portions. For example, a first data portion can comprise the (previously) most current version of the data. Further, a second data portion can comprise updated data appended to the second version. Additionally, previous versions of the data (e.g., the original version 118, the first modified version 122, and so on) are not updated when the subsequent data version is appended to the (previously) most current version.

Figure 7:
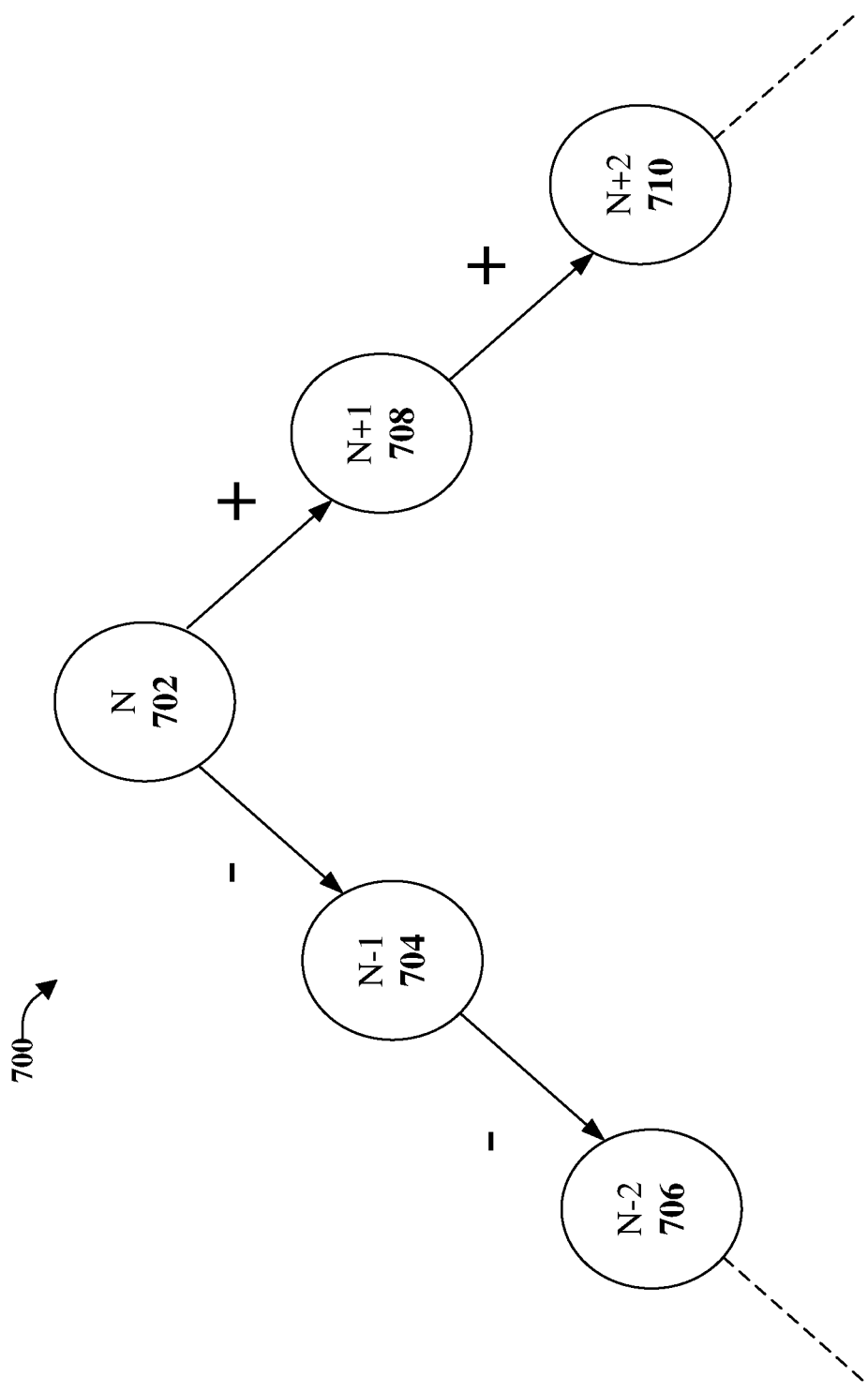
FIG. 7 illustrates an example, non-limiting, representation of an object versions tree in accordance with one or more embodiments described herein.

In further detail, FIG. 7 illustrates an example, non-limiting, representation of an object versions tree in accordance with one or more embodiments described herein. FIG. 7 illustrates how a migration target storage (e.g., the target device 116) can handle new versions of an object, which has been migrated in reverse order. After migration of the object is completed, the target storage system is free to resume normal handling of new object versions. The latest object version is an immutable data portion (e.g., as established by the assignment component 602). When, for example, a new object version adds another data increment to the latest version, the new latest object version references two data portions. The first data portion is the old latest object version. The second data portion is the data appendage the new latest version brings to the system. Despite the fact migration of the object versions has been performed in reverse order, there is no need to update the older object versions every time a new one is created because the older object versions depend only on the object version, which was migrated first, and this version is represented as an immutable data portion.

An attempt to depict all the object versions graphically can result in a tree-like structure, where the object version, which was the latest one at the moment the object was migrated, is the tree root. It is version N 702 in FIG. 7 (e.g., the Nth modified version 122).

The object version N 702 can be the base object version after migration for all the previous versions (e.g., object version N−1 704, object version N−2 706, and so on) and future versions (e.g., object version N+1 708, N+2 710, and so on). The previous object versions (e.g., object version N−1 704, object version N−2 706) can be produced by applying negative patches (e.g., negative deltas) to the version N. Further object versions (e.g., object version N−1 704, object version N−2 706) can be produced by applying positive patches (e.g., positive patches) to the version N. Note that there is no trade-off between read performance for the latest object version and write performance for further object versions because creation of further object versions is not impacted by the alteration of the versions migration order.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 8:
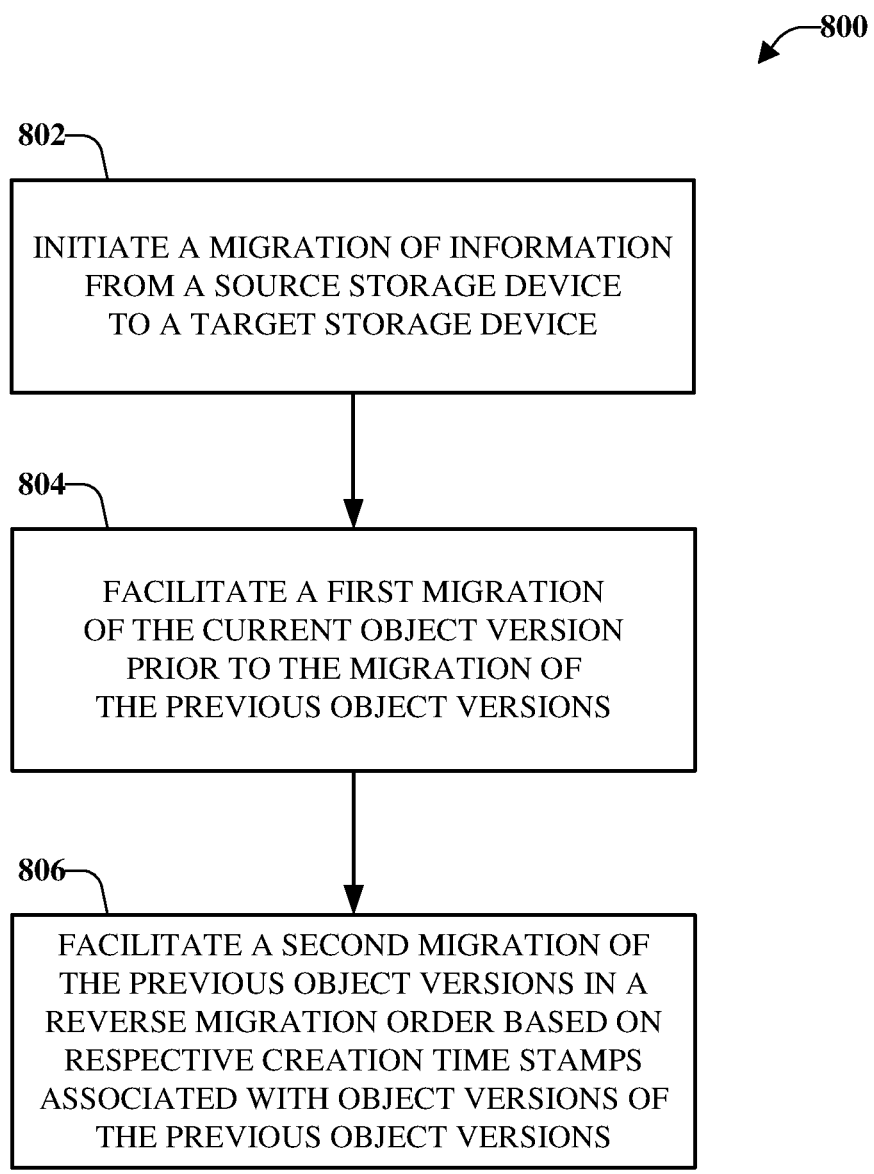
FIG. 8 illustrates a flow diagram of an example, non-limiting, method that facilitates migration of versioned data in accordance with one or more embodiments described herein.

FIG. 8 illustrates a flow diagram of an example, non-limiting, method 800 that facilitates migration of versioned data in accordance with one or more embodiments described herein. Repetitive description of like elements employed in other embodiments described herein is omitted for sake of brevity.

At 802, a migration of information from a source storage device to a target storage device can be initiated. The information can comprise a current object version of data and previous object versions of the data. For example, the current object version of data can comprise portions of the previous object versions of the data. For example, the information can include two (or more) object versions. A first object version can be an initial (e.g., an original) version. The second object version can include at least a portion of the initial object version and one or more modifications (e.g., additions, deletions, alterations, and so on). Further, a third object version can include at least a portion of the initial object version, at least a portion of the second object version, and one or more modifications to the initial version and/or the second object version. In the example, the third object version can be the current object version of data and the first object version and the second object versions can be previous object versions of the data.

A first migration of the current object version can be facilitated, at 804. The first migration of the current object version can be performed prior to a migration of the previous object versions of data. According to some implementations, facilitating the first migration can comprise storing the current object version as a single segment of data.

Upon or after the first migration, at 804, a second migration of the previous object versions can be facilitated in a reverse migration order, at 806. For example, facilitating the first migration and facilitating the second migration can comprise migrating the first version and the second version in a last in-first out order (e.g., a reverse chronological order).

In an example, the version ID "grows" for each new object version. For example, it can be determined that a version B is older than a version A because the version B ID is, in some determined manner, greater than the version A ID. In some implementations, the versions order can be determined from the manner in which the storage device lists the versinos order in reply to a "get_versions" call.

According to some implementations, facilitating the first migration and facilitating the second migration can comprise facilitating an increase in a defined measure of input-output performance of the second storage device. In an implementation, facilitating the first migration and facilitating the second migration can comprise facilitating an increase in a defined measure of input-output performance of the second storage device. In an additional or alternative implementation, facilitating the first migration and facilitating the second migration can comprise facilitating a reduction of a defined measure of a per-object capacity overhead of the second storage device.

Figure 9:
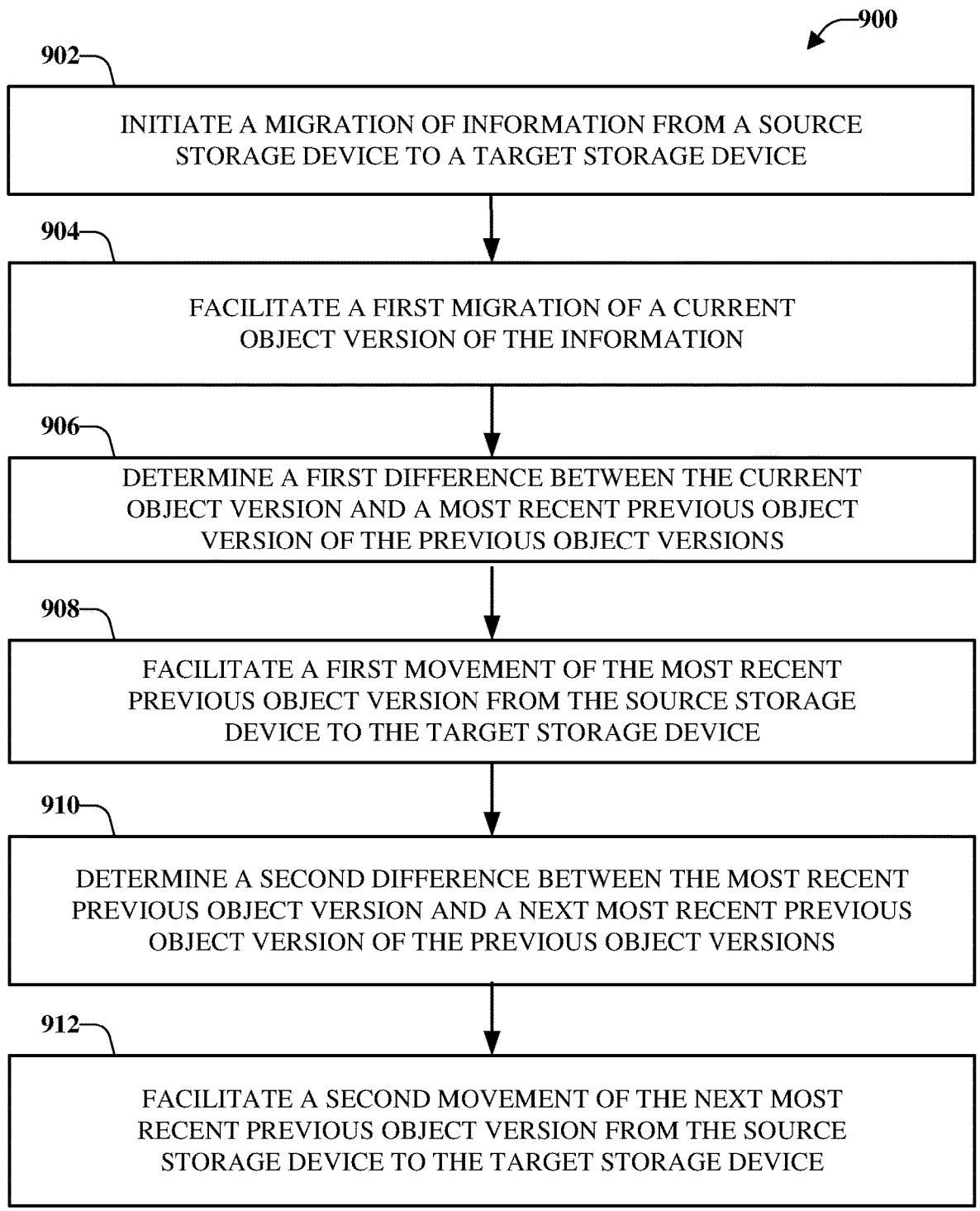
FIG. 9 illustrates a flow diagram of an example, non-limiting, method that determines respective deltas between different data versions for data migration in accordance with one or more embodiments described herein.

FIG. 9 illustrates a flow diagram of an example, non-limiting, method 900 that determines respective deltas between different data versions for data migration in accordance with one or more embodiments described herein. Repetitive description of like elements employed in other embodiments described herein is omitted for sake of brevity.

At 902, a migration of information from a source storage device to a target storage device can be initiated. The information can comprise a current object version of data and previous object versions of data. Further, at 904, a first migration of the current object version can be performed.

At 906, a first difference between the current object version and a most recent previous object version of the previous object versions can be determined. For example, a change between the versions can be determined between the current object version and the most recent previous object version. A second migration can be facilitated at 908. The second migration can comprise facilitating a first movement of the most recent previous object version from the source storage device to the target storage device. The first movement can comprise the first difference.

The method 900 can continue, at 910 when a second difference between the most recent previous object version and a next most recent previous object version of the previous object versions can be determined. Upon or after the second difference is determined, at 912, a second movement of the next most recent previous object version from the source storage device to the target storage device can be facilitated. The second movement can comprise the second difference. Subsequent previous object versions can be moved based on respective differences determined in a reverse chronological order in a similar manner.

Figure 10:
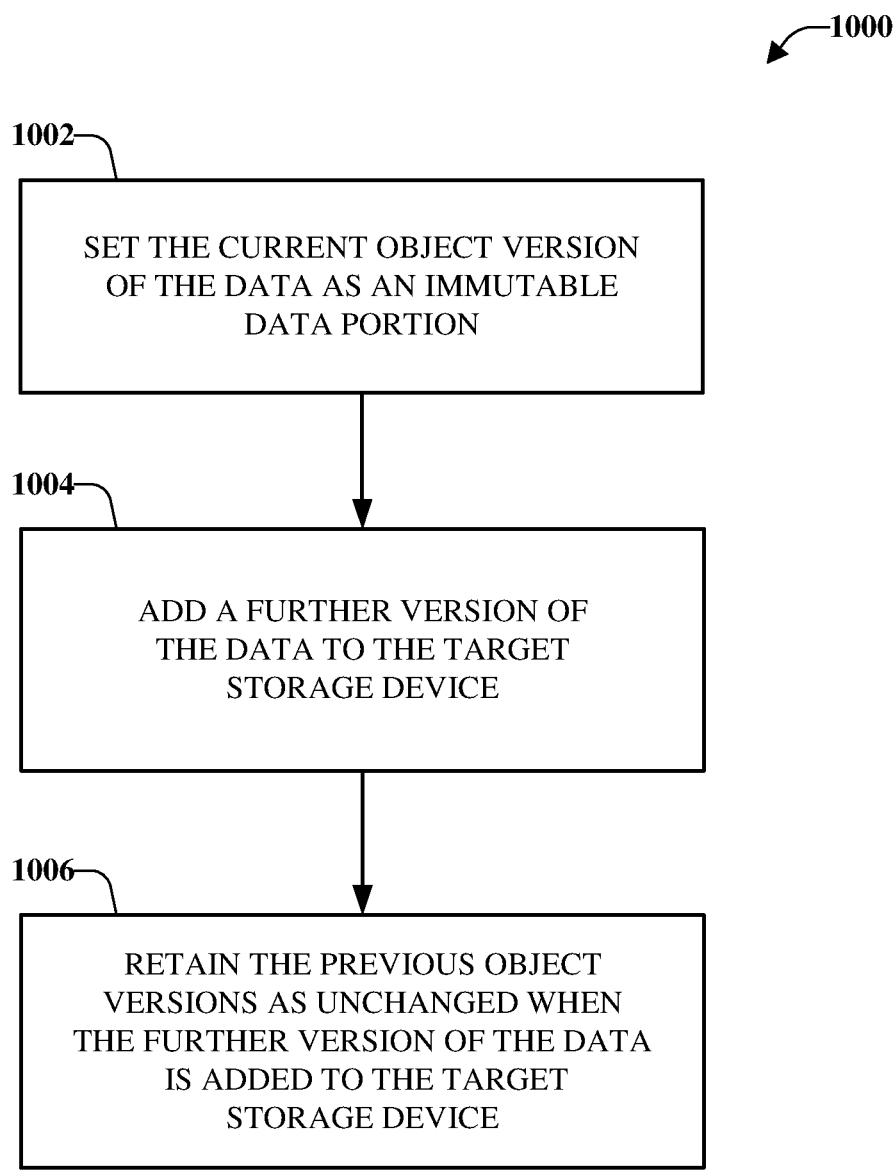
FIG. 10 illustrates a flow diagram of an example, non-limiting, method that facilitates handling of new versions of an object that was migrated in reverse order in accordance with one or more embodiments described herein.

FIG. 10 illustrates a flow diagram of an example, non-limiting, method 1000 that facilitates handling of new versions of an object that was migrated in reverse order in accordance with one or more embodiments described herein. Repetitive description of like elements employed in other embodiments described herein is omitted for sake of brevity.

The method 1000 starts, at 1002, when a current object version of the data is set as an immutable data portion. For example, upon or after movement of the information from a first device to a second device, the most current version of data can be set as the immutable data portion.

At 1004, a further version (or future version) of the data can be added to the second device. For example, the further version of the data can comprise a data change to the current object version. The further version of the data can comprise a first data portion that comprises the current object version and a second data portion that comprises the data change. In addition, at 1006, previous object versions can remain unchanged when the further version of the data is added to the target storage device.

Figure 11:
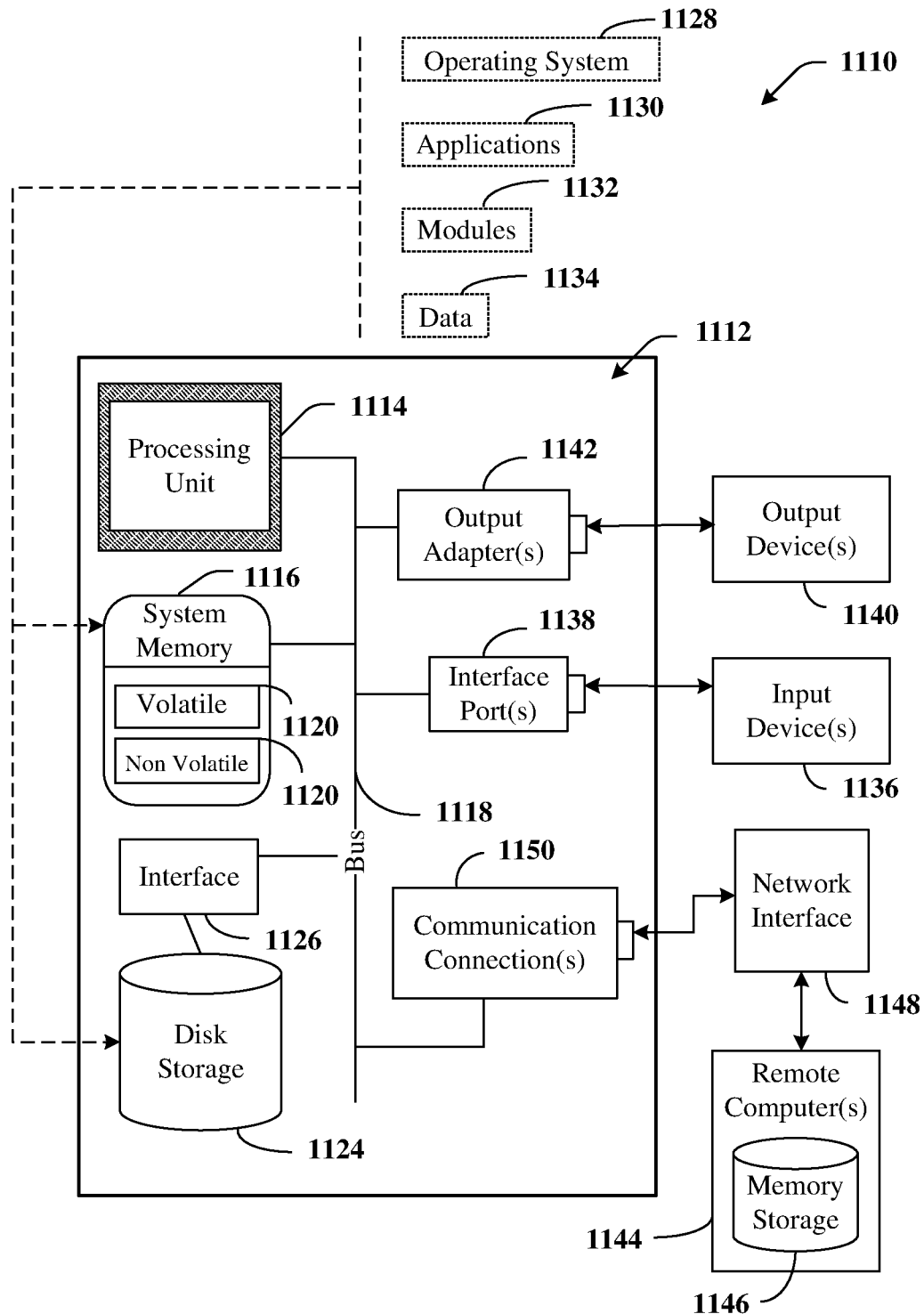
FIG. 11 illustrates an example, non-limiting, computing environment in which one or more embodiments described herein can be facilitated.

In order to provide a context for the various aspects of the disclosed subject matter, FIG. 11 as well as the following discussion are intended to provide a brief, general description of a suitable environment in which the various aspects of the disclosed subject matter can be implemented.

With reference to FIG. 11, an example environment 1110 for implementing various aspects of the aforementioned subject matter comprises a computer 1112. The computer 1112 comprises a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 comprises volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can comprise read only memory (ROM), programmable ROM (PROM), electrically programmable ROM (EPROM), electrically erasable PROM (EEPROM), or flash memory. Volatile memory 1120 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also comprises removable/non-removable, volatile/non-volatile computer storage media. FIG. 11 illustrates, for example a disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software comprises an operating system 1128. Operating system 1128, which can be stored on disk storage 1124, acts to control and allocate resources of the computer 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 comprise, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 comprise, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically comprises many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 comprises, for exemplary purposes only, internal and external technologies such as, modems including regular telephone grade modems, cable modems and DSL modems, ISDN adapters, and Ethernet cards.

Figure 12:
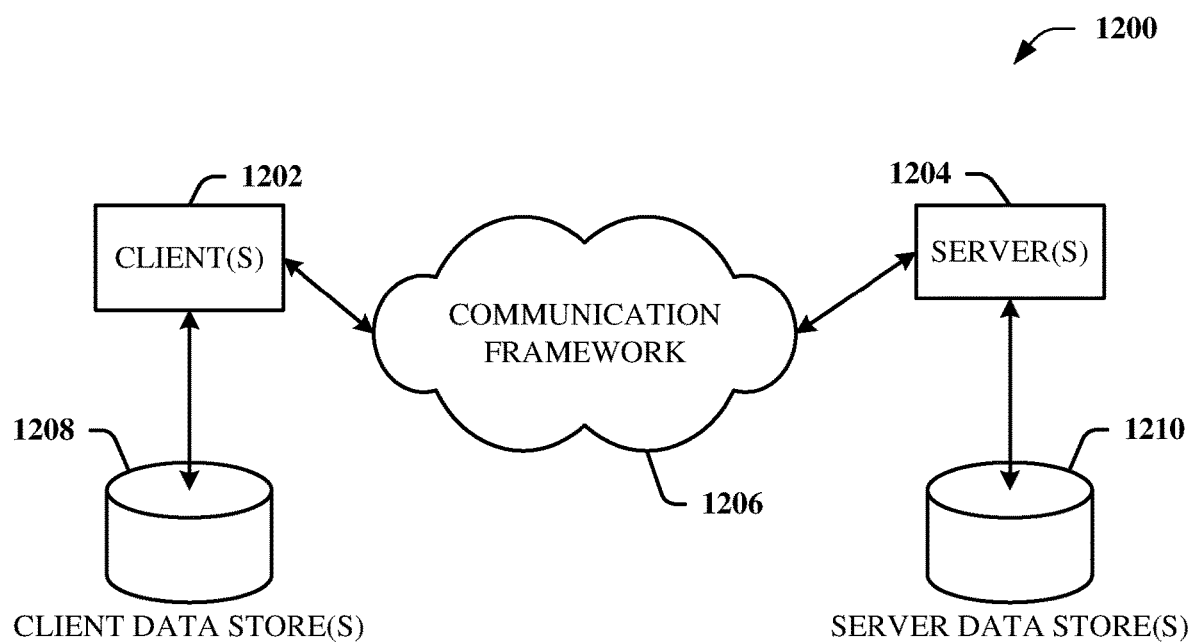
FIG. 12 illustrates an example, non-limiting, networking environment in which one or more embodiments described herein can be facilitated.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   determining, by a system comprising a processor, that data of a first storage device is scheduled to be migrated to a second storage device, wherein the first storage device and the second storage device are distributed storage devices, wherein the data is represented according to a first version, a second version, and a third version, and wherein the first version was created prior to the second version, wherein the first version comprises a first portion and a second portion, wherein first content of the first portion is different than second content of the second version, and wherein third content of the second portion is the same as the second content of the second version;
   facilitating, by the system, a first migration of the second version, as a single piece of data, from the first storage device to the second storage device; and
   based on a determination that the first migration of the second version has completed, facilitating, by the system, a second migration of the first portion of the first version from the first storage device to the second storage device, wherein the second portion of the first version is not moved during the second migration, designating, by the system, the second version as an unchangeable data portion; and adding, by the system, the third version to the second storage device, wherein the third version comprises an updated data increment to the second version.

2. The method of claim 1, wherein the facilitating the first migration comprises storing, by the system, the second version as the single piece of data.

3. The method of claim 1, further comprising:
   determining, by the system, a change between the second version and the first version prior to the facilitating the second migration of the first version, wherein the first portion is not included in the second version, and wherein the second portion of the first version is included in the second version and is not included in the second migration of the first version.

4. The method of claim 1, wherein the facilitating the first migration and the facilitating the second migration comprises migrating the first version and the second version in a last in-first out order.

5. The method of claim 1, wherein the third version comprises a reference to two data portions, wherein a first data portion of the two data portions comprises the second version, and wherein a second data portion of the two data portions comprises updated data appended to the second version.

6. The method of claim 1, wherein the first version is not updated in response to the third version being added to the second version.

7. The method of claim 1, further comprising:
   identifying, by the system, the first version by an object identifier and a first version identifier; and
   identifying, by the system, the second version by the object identifier and a second version identifier.

8. The method of claim 1, wherein the facilitating the first migration and the facilitating the second migration comprises facilitating an increase in a defined measure of input-output performance of the second storage device.

9. The method of claim 1, wherein the facilitating the first migration and the facilitating the second migration comprises facilitating a reduction of a defined measure of a per-object capacity overhead of the second storage device.

10. A system, comprising:
    a processor; and
    a memory that stores executable instructions that, when executed by the processor, facilitate performance of operations, comprising:
      initiating a migration of information from a source storage device to a target storage device, wherein the information comprises a current object version of data and previous object versions of data, wherein the current object version of data comprises portions of the previous object versions of data;
      facilitating a first migration of the current object version of data as a single segment of data prior to the migration of the previous object versions of data;
      determining that respective first portions of the previous object versions are not included in the current object version of data and that respective second portions of the previous object versions are included in the current object version of data; and determining a first difference between the current object version of data and a most recent previous object version of the previous object version of data;
      facilitating a second migration of the respective first portions of the previous object versions of data in a reverse migration order, wherein the facilitating the second migration comprises facilitating a first movement of a first selected portion of the most recent previous object version from the source storage device to the target storage device, and wherein the first movement comprises the first different, and wherein the respective second portions of the previous object versions of data are not moved during the second migration.

11. The system of claim 10, wherein the operations further comprise:
    determining a second difference between the most recent previous object version and a next most recent previous object version of the previous object versions of data, wherein the facilitating the second migration comprises facilitating a second movement of a second selected portion of the next most recent previous object version from the source storage device to the target storage device, and wherein the second movement comprises the second difference.

12. The system of claim 10, wherein the operations further comprise setting the current object version of data as an immutable data portion.

13. The system of claim 12, wherein the operations further comprise adding a further version of data to the target storage device, and wherein the further version of data comprises a data change to the current object version of data.

14. The system of claim 13, wherein the further version of data comprises a first data portion that comprises the current object version of data and a second data portion that comprises the data change.

15. The system of claim 13, wherein the previous object versions of data remain unchanged when the further version of data is added to the target storage device.

16. The system of claim 10, wherein the facilitating the first migration and the facilitating the second migration comprises migrating the current object version of data and the previous object versions of data in a last in-first out order.

17. The system of claim 10, wherein the facilitating the first migration and the facilitating the second migration comprises facilitating an increase in a defined measure of input-output performance of the target storage device.

18. The system of claim 10, wherein the facilitating the first migration and the facilitating the second migration comprises facilitating a reduction of a defined measure of a per-object capacity overhead of the target storage device.

19. A non-transitory computer-readable storage medium comprising instructions that, in response to execution, cause a system comprising a processor to perform operations, comprising:

mapping a first device to a second device based on a first determination that data contained in the first device is to be migrated to the second device, wherein the data comprises an original object version and modified object versions;

facilitating a first migration of a last modified object version of the modified object versions as a single piece of data;

facilitating a second migration of a first portion of a second last modified object version of the modified object versions, wherein the first portion comprises a first difference between the last modified object version and the second last modified object version, and wherein first other portions of the second last modified object version, other than the first portion, are not included in the second migration; and facilitating a third migration of a second portion of the original object version based on a second determination that migration of the modified object versions has completed, wherein the second portion comprises a second difference between the second last modified object version and the original object version, and wherein second other portions of the original object version are not included in the third migration; determining a first delta between the last modified object version and the second last modified object version, the first delta comprises first content, wherein the facilitating the second migration comprises facilitating a first movement of the first content as the first portion; and determining a second delta between the second last modified object version and the original object version, the second delta comprises second content, wherein the facilitating the third migration comprises facilitating a second movement of the second content as the second portion.

20. The non-transitory computer-readable storage medium of claim 19, wherein the operations further comprise:

designating, by the system, the last modified object version of the data as an unchangeable data portion; and adding, by the system, an updated version of the data to the second device, wherein the updated version comprises an incremental data change to the last modified object version.

* * * * *